Jan. 19, 1926.  1,570,301
W. S. HADAWAY, JR
ELECTRIC HEATING SYSTEM
Original Filed July 1, 1921
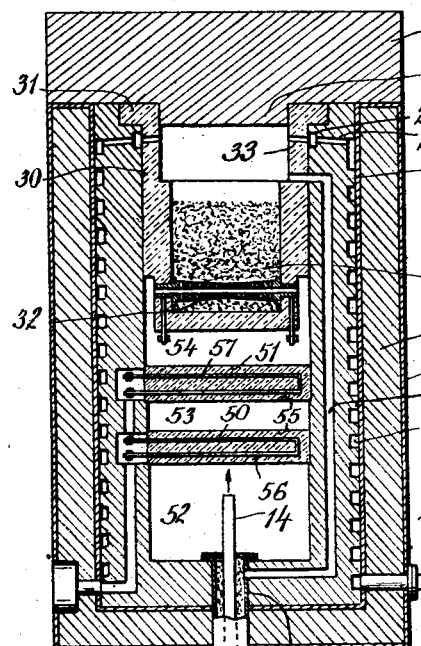
Fig. 1.
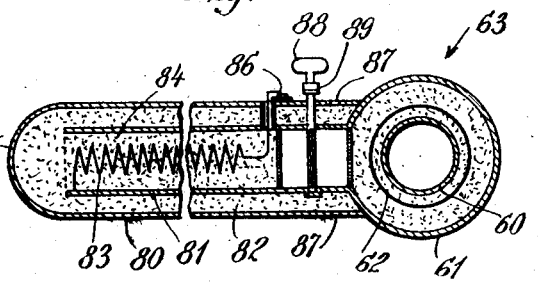
Fig. 2.
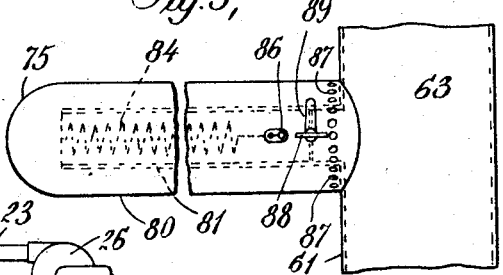
Fig. 3.
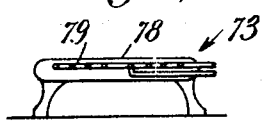
Fig. 4.
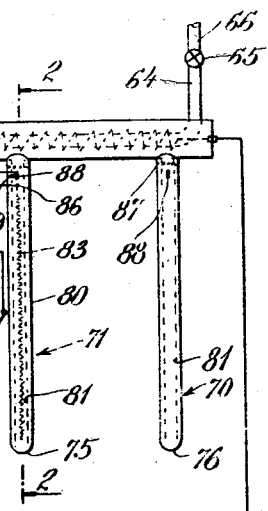
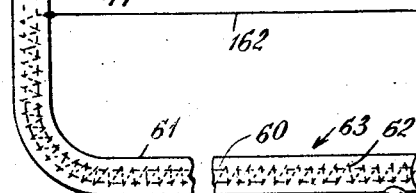
Inventor
William S. Hadaway, Jr.
By his Attorney
E. W. Marshall Patented Jan. 19, 1926.

1,570,301

UNITED STATES PATENT OFFICE.

WILLIAM S. HADAWAY, JR., OF NEW ROCHELLE, NEW YORK.

ELECTRIC HEATING SYSTEM.

Application filed July 1, 1921, Serial No. 481,772. Renewed May 5, 1925.

*To all whom it may concern:*

Be it known that I, WILLIAM S. HADAWAY, Jr., a citizen of the United States, and a resident of New Rochelle, Westchester County, and State of New York, have invented certain new and useful Improvements in Electric Heating Systems, of which the following is a specification.

This invention relates to heat generators and distributing systems and more particularly to an improved form of high efficiency heat generator and means for distributing heat to working points where it may be used.

Broadly stated it is an object of the present invention to provide an improved combination of heat generator and system of distribution whereby heat may be efficiently distributed to desired points.

More particularly it is an object to provide means for utilizing the generated heat at a desired working point with reduced operating cost and simplified installation of the distributing means.

Another object relates to boosting the degree of heat at or near the working point.

Another object relates to the provision of distributing means for transferring heat adapted to serve the double purpose of conducting a heat transferring medium and of raising the temperature of incoming medium to prepare the latter for use in heat transference.

Another object relates to the provision of a conducting channel adjacent to the heat generator and means for introducing into the channel a variable supply of air for controlling the combustion and thereby obtaining the desired degree of heat.

Still another object relates to the provision of heater utilities in novel combination with heat exchange chambers, whereby high temperature working members may be obtained effectively.

Other objects will appear as the description of the invention progresses.

Referring to the drawing:

Fig. 1 shows a heat generator and system of distribution of my invention.

Fig. 2 shows an enlarged sectional view of a working member on the line 2—2 of Fig. 1.

Fig. 3 is an enlarged view of one of the working members shown in Fig. 1, and

Fig. 4 is an elevation of a hot plate.

Like characters of reference denote corresponding parts in all figures of the drawing.

10 designates an outer casing of refractory material open at the top, the surface of which may be covered with metal as shown at 11. 20 is an inner casing of similar refractory material, also open at the top, which fits within the outer casing. A receptacle 30 of refractory material, also open at the top, fits within this inner casing, and is provided with a flange 31 near its upper end which fits an annular groove in the inner casing to position the receptacle. A plurality of passages, such as 40, extend from the upper portion of the device to the upwardly extending portion 41 of the channel 63. A cover 12 of refractory material is arranged to rest upon the top of the casing and the receptacle and has a dependent boss 13 which projects into the receptacle sligthly in order to position the cover.

Within the inner casing 20 and below the receptacle 30 is formed a heat generating chamber. A plurality of vapor heaters are placed within this chamber. In the present embodiment two such heaters are shown designated by the reference numerals 50 and 51. These rest upon ledges formed on the inner surface of the inner casing in such a way as to hold them transversely across the chamber so that they divide the chamber into three compartments 52, 53 and 54. These vapor heaters comprise porous body portions 55 in which are embedded electrical heater elements 56 and 57. A practical form of vapor heater for this purpose is described in detail in Patent No. 1,349,131 issued to me August 10, 1920.

The lower part of the receptacle is of reduced diameter and through this part extends transversely a hollow dissociation heater or glower 32. This is a perforated tube preferably in the form of a fulgurite and made of oxides of magnesia or other material which may be operated at a glowing temperature and which is a conductor of electricity only when hot.

The electrical connections of the dissociation heater 32 and the heater elements 56, 57 with a source of electric current may be made in any desired manner, as for example as shown in Fig. 3 of Patent No. 1,410,566, electric furnaces, issued to me March 28, 1922.

In the outer surface of the inner casing 20 is a spiral groove 21 with the lower end of which is connected an air inlet 22 which may be controlled by a valve 23. An annular groove 24 in the inner surface of the inner casing is connected with the upper part of the spiral groove 21 by radial passages 25. Radial passages 33 through the receptacle connect groove 24 with the space within the receptacle. An air pump or blower 26 is provided to cause a current of air to be supplied to these passages.

Within the receptacle 30 may be placed if desired a combustible 34 such as coke.

The main distributing channel 63, several of which may be employed if desired, comprises an inner pipe 60 and a concentric outer pipe 61 spaced apart. In the space between these pipes and adapted to position the inner pipe 60, there is provided a suitable material for permitting the passage of a vapor, such as steam. I prefer to use for this purpose granular carborundum or any similar refractory material capable of withstanding a high temperature. Imbedded in this material there may be provided one or more electrical conductors 62 of suitable resistance. Connections to a source of current may be provided in a well known manner whereby these conductors may be heated to start the operation of the device. The connections in Fig. 1 may be employed when the tube itself is used as the heater element or resistor, it being understood that conductor 162 may be placed inside the casing 61.

At the end of each channel 63 remote from the heat generator there is provided an inlet 64 connected with the inner pipe 60 whereby water or other desired medium may be introduced. Means for controlling the flow such as a needle valve 65 are provided, connected by a supply pipe 66 with a source of supply. A suitable pressure of say two or three pounds is preferably impressed upon the medium, in any well known manner, as for example by providing a reservoir raised with respect to the valve 65.

At desired points along the channel 63 are taps for working members such as 70, 71, and 72. It will be noted that these taps are taken off the main line in a way generally similar to a multiple tap system of electric distribution, and equally as simple. Another working member 73 is connected with the main line through an intermediate member 74. The member 71 comprises an elongated tubular casing or armor 80 of metal (Figs. 2 and 3), an inner tubular metallic member 81 which is substantially coextensive with the casing, and is smaller in diameter, being spaced therefrom by an insulating granular mass 82 which may be composed of particles of carborundum or the like. Within the inner tube is an electric heating coil 83 which is connected at the working end of the device to the inner tube 81, and is separated from the inner tube throughout its length by finely divided insulating particles 84 which constitute a porous or granular mass similar to the mass 82. The space occupied by mass 82 and 84 forms a heat exchange chamber. The tube 81 constitutes one of the electrical terminals and the coil 83 is connected in an electrical circuit comprising the source of current 85 and a control switch having the arm 89 and the contact point 86.

The member 70 is similar to that just described except that the electrical heater 83 is omitted. The working ends 75, 76 may be used for work as for example, for branding or the like.

The member 74 is similar to 71 but instead of being provided with an integral utility, the utility is separated therefrom so that the member 74 acts as a booster for increasing the line temperature before it enters the utility 73. Said utility may be of any desired character, that shown being a hot plate 73. By this means the utility may be a casting formed independent of electrical requirements, and connected up to the member 74 in a simple manner. As shown in the drawing (Fig. 4), the utility may comprise a body portion 78 having a spirally arranged passage 79 for conducting the vapor therethrough and back to member 74.

The tap 77 is taken directly from the main line 63 and connects to a similar hot plate 72, without any electric booster or heat exchange member and without a return connection.

It is understood that these taps may be provided in any desired order or location, or in any desired number subject only to the limitation of the capacity of the system.

In operation, water is admitted in limited quantites by the needle valve 65 into pipe 60. An electric current is temporarily caused to flow through conductors 62 and pipe 60, of a sufficient intensity and for a sufficient time to start the device. The generated steam will leave the pipe 60 by way of inlet 14 and is admitted to the compartment 52. This steam passes through the vapor heater 50 to the compartment 53 and in doing this its temperature is raised.

The heated vapor then passes through the vapor heater 51 into compartment 54 and this further raises its temperature. The heated vapor then passes into the receptacle 30 through the dissociation heater 32. The highly heated vapor escapes into the receptacle through the perforations of the tube 32 and at the same time heats the tube sufficiently to make it a conductor of electricity which heats the tube to a glowing temperature. The temperature of the glower tube becomes sufficiently high to dissociate the vapor, breaking it up into its constituent elements, hydrogen and oxygen, and the oxygen is recombined with the contents of receptacle 30 by combustion thus producing an intense heat. The coke 34 is also caused to burn, further to increase the temperature. The dissociation of the vapor takes up heat and serves as an automatic means for preventing an indefinite increase in the temperature of the tube 32. I have found that the vapor is not entirely dissociated, and in the present invention I employ the unconsumed vapor for the additional purpose of transferring and exchanging heat, as will be set forth subsequently.

When the valve 23 is open, air will be admitted to the receptacle and into the flame which will unite with the burning gases and further increase their temperature. In doing this the air will circulate in the spiral groove 21 where it will become pre-heated to a certain extent and will at the same time increase the heat insulating effect of the casings 10 and 20.

The amount of air admitted will determine the combustion of the hydrogen released by the dissociation of the vapor. If a great deal of air is admitted all of the hydrogen may be united with the oxygen of the air admitted immediately upon dissociation of the vapor within the generator. If no air is admitted through the valve 23, the hydrogen will not be consumed until it reaches one of the heat intensifying members, such as 75. Thus by regulating the valve 23 the desired amount of heat to be generated within the generator, or at the heat intensifying member may be controlled.

When the device is started, the current may be cut off from the member 60 and connected to members 80, 74, in any desired manner. A manual switch 92 is shown for this purpose. Thus the electric load may remain substantially constant during the operation of the system.

While in the structure shown, there are two vapor heaters and a dissociation heater, this invention is not restricted to any specific number or arrangement of the units and a single vapor heater may be used or any desired number of them.

The gases resulting from the action just described together with the uncombined vapor finds its way back to the lower part of the heater and finds a path of escape through the passage 40 into the channel 63. On account of the exceedingly high temperature produced in this structure, the heat distribution depends, within a body of this shape, upon rapidity of diffusion and not upon circulation. Outside of the generator, in the distributing channel 63, distribution depends upon circulation. After the action has been started, the current may be cut off from the heaters 50, 51, if desired, and the action maintained as long as desired by combustion of the hydrogen and coke, independent of these heaters. The gases and vapor traverse the main channel 63, its movement being resisted by the porous material, and raise the temperature of the medium incoming through tube 60. After the current through tube resistor 60 and conductors 62 or 162 has been discontinued, the channel 63 serves the double purpose of acting on the incoming medium by heating the same and as a transferring member for conducting heat to desired points. A portion of the hot vapor traverses tap 77 and the tool 72, heating the latter for working purposes, and then escaping to the atmosphere. Another portion traverses the heat exchange chamber of the tap 70, heats the working member 76, and escapes to the atmosphere through vents such as those shown at 87. A shut off valve such as 88 may be provided to render the member 76 inactive.

Still another portion traverses the heat exchange chamber of the tap 71, being boosted by means of the electric heat generator 83 and heats the working member 75, escaping through the vents 87. The shut off valve may be conveniently provided with a switch 86, 89 for simultaneously controlling the electric circuit of the booster. Any unconsumed vapor will then become ignited. This is more fully described in my Patent No. 1,406,850 dated February 14, 1922.

Another portion of the hot vapor traverses the similar heat exchange chamber of tap 74 and the remotely situated working tool 73 escaping through vents 87. Thus it will be seen that I have shown four combinations as examples of forms in which the working members may be employed. Other combinations thereof will readily occur to those skilled in the art; and similarly the distributing means and other features of the invention may be modified without departing from its spirit; and therefore it is expressly understood that the scope of the invention is not to be determined by the present disclosure, reference being had to the appended claims for that purpose.

What I claim is:

1. In a heat distributing system, the combination with a vapor heater and a plurality of working tools, of a vapor conductor for transferring vapor from said heater to the tools comprising an elongated casing, a porous mass therein offering a resistance to the flow of vapor, and a valve associated with each of said tools adapted to discontinue the flow of vapor to the associated tool independent of the other tools.

2. In a heat distributing system, the combination with a vapor heater and a plurality of working tools, of a hollow chamber containing a porous mass adapted to transfer vapor from said heater to the tools, each of said tools having an independent valve for rendering the associated tool inactive.

3. In combination with a heater, a fluid passage comprising a booster and a tool in series, a heat intensifying member in said booster and coextensive with a portion of the length of said passage, and a valve at the inlet end of said booster adapted to render said booster and tool inactive.

4. In a heat distributing system, a source of heat, a plurality of working tools spaced from said source, and a booster intermediate said source and one of said tools comprising a heat intensifying member having a fluid passage, an outer casing adapted to provide a heat exchange member and a valve at the inlet of said booster for rendering said tool inactive.

5. In a heat distributing system, a source of heat, a plurality of working tools spaced from said source, a booster intermediate said source and one of said tools having a fluid passage, means for electrically generating heat therein, a valve for rendering said tool and booster inactive and a switch for rendering said electrical means inactive.

6. In a heat distributing system, a source of heat, a working tool spaced from said source, a booster intermediate said source and tool, heat absorbent material within said booster adapted to permit the gradual flow of fluid therethrough, means for electrically generating heat within said booster, a valve adapted to discontinue the flow of fluid and a switch adapted to render said electrical means active when said valve is in its open position.

7. In combination with a heater comprising a fuel combustion chamber, an electrical glower therein adapted to raise the temperature of vapor and a double pipe for leading vapor to and from said chamber.

8. The combination with a heater comprising a fuel combustion chamber, an electrical glower therein, a double pipe for leading vapor to and from said chamber, and separate means for admitting air to the combustion chamber.

9. The combination with a heater comprising a heat insulating casing constructed to form a chamber, a porous partition dividing the chamber into compartments, a combustion chamber within the casing; of a double pipe for leading vapor to and from said chamber whereby said vapor is passed through the compartments successively during its passage through the chamber.

10. In a heat distributing system the combination with a source of heat and a plurality of working tools, a main line channel for conducting a heated vapor from said source to a plurality of tools, and a booster intermediate the main line and one of said tools, of electrical means within said main line channel to initiate operation of the system, electrical means within the booster for generating heat therein, and an interlocking switch controlling said electrical means.

11. In a heat distributing system the combination with a source of heat and a plurality of working tools, a main line channel for conducting a heated vapor from said source to a plurality of tools, and a booster intermediate the main line and one of said tools, of electrical means within said main line channel to initiate operation of the system, electrical means within the booster for generating heat therein, and an interlocking switch adapted to render active one or the other of said electrical means.

12. In a heat distributing system the combination with a source of heat and a plurality of working tools, a main line channel for conducting a heated vapor from said source to a plurality of tools, and a booster intermediate the main line and one of said tools, of electrical means within said main line channel to initiate operation of the system, electrical means within the booster for generating heat therein, and an interlocking switch adapted to render active the electrical means in the main line channel and subsequently to render said electrical means inactive and to render active the booster electrical means.

13. In a heat distributing system, the combination with one or more working tools, and vapor conducting means for transferring heat to said tools, of a source of heat comprising a fuel combustion chamber, an electrical glower therein, and means for passing vapor through said glower into fuel in the combustion chamber.

14. In a heat distributing system, the combination with one or more working tools, and vapor conducting means for transferring heat to said tools, of a source of heat comprising a fuel combustion chamber, an electrical glower therein, and means for passing vapor through said glower into fuel in the combustion chamber, said glower being arranged to raise the temperature of the vapor to a point above the ignition point of the fuel.

15. In a heat distributing system, the combination with one or more working tools, and means for conducting heat to said tools, of a source of heat comprising a fuel combustion chamber, an electrical glower therein which is a non-conductor of electricity at ordinary temperatures but a conductor when hot, means for supplying electrical energy to the glower, and means for passing hot vapor through said glower into fuel in the combustion chamber.

16. In a heat distributing system, the combination with one or more working tools, and vapor conducting means for transferring heat to said tools, of a source of heat comprising a fuel combustion chamber, an electrical glower therein which is a non-conductor of electricity at ordinary temperatures but a conductor when hot, means for supplying electrical energy to the glower, and means for passing hot vapor through said glower into fuel in the combustion chamber, said glower being initially energized by the combined effect of the electrical energy and the hot vapor.

17. In a heat distributing system, the combination with one or more working tools, and vapor conducting means for transferring heat to said tools, of a source of heat comprising a fuel combustion chamber, a glower tube therein which is a non-conductor of electricity at ordinary temperatures but a conductor when hot, means for supplying hot vapor to the fuel through said tube and means for supplying electrical energy to said tube when hot.

18. In a heat distributing system, the combination with one or more working tools, and vapor conducting means for transferring heat to said tools, of a source of heat comprising a fuel combustion chamber, an electrical glower therein, and means for admitting air to the combustion chamber.

19. In a heat distributing system, the combination with one or more working tools, and vapor conducting means for transferring heat to said tools, of a source of heat comprising a fuel combustion chamber, an electrical glower therein which is a non-conductor of electricity at ordinary temperatures but a conductor when hot, means for supplying electrical energy to the glower, and means for admitting air to the combustion chamber.

20. In a heat distributing system, the combination with one or more working tools, and vapor conducting means for transferring heat to said tools, of a source of heat comprising a fuel combustion chamber, an electrical glower therein which is a non-conductor of electricity at ordinary temperatures but a conductor when hot, means for supplying electrical energy to the glower, means for passing hot vapor through said glower into fuel in the combustion chamber, said glower being initially energized by the combined effect of the electrical energy and the hot vapor, and means for admitting air to the combustion chamber.

21. In a heat distributing system, the combination with one or more working tools, and vapor conducting means for transferring heat to said tools, of a source of heat comprising a fuel combustion chamber, a glower tube therein which is a non-conductor of electricity at ordinary temperatures but a conductor when hot, means for supplying hot vapor to the fuel through said tube, and means for admitting air to the combustion chamber.

22. In a heat distributing system, the combination with one or more working tools, and vapor conducting means for transferring heated vapor to said tools, of a source of heat comprising an electric vapor heater, a combustion chamber and a glower in the receptacle which is a non-conductor of electricity at ordinary temperatures but a conductor when hot, means for passing vapor through the vapor heater and the glower into fuel in the combustion chamber.

23. In a heat distributing system, the combination with one or more working tools, and vapor conducting means for transferring heated vapor to said tools, of a source of heat comprising a heat insulating casing constructed to form a chamber, a porous vapor heater dividing the chamber into compartments, a combustion chamber within the casing, a glower in the combustion chamber, and means for passing vapor through the vapor heater and through the glower into fuel in the combustion chamber.

24. In a heat distributing system, the combination with one or more working tools, and vapor conducting means for transferring heated vapor to said tools, of a source of heat comprising a heat insulating casing constructed to form a chamber, a plurality of porous vapor heaters dividing the chamber into compartments, a combustion chamber within the casing, a glower in the combustion chamber, and means for passing vapor successively through the vapor heaters and the glower and into fuel in the combustion chamber.

25. In a heat distributing system, the combination with one or more working tools, and vapor conducting means for transferring heated vapor to said tools, of a source of heat comprising a heat insulating casing constructed to form a chamber, a porous partition dividing the chamber into compartments, electric heating elements in said partition, a combustion chamber in the casing, a glower in the combustion chamber, and means for passing vapor through the partition and through the glower into fuel in the combustion chamber.

26. In a heat distributing system, the combination with one or more working tools, and vapor conducting means for transferring heated vapor to said tools, of a source of heat comprising a heat insulating casing constructed to form a chamber, a plurality of porous partitions dividing the chamber into compartments, electric heating elements in said partitions, a combustion chamber in the casing, a glower in the combustion chamber, and means for introducing vapor directly into one of the compartments and through the partitions into the others whereby its temperature is raised in successive stages, and then through the glower into fuel in the combustion chamber.

27. In a heat distributing system, the combination with one or more working tools, and vapor conducting means for transferring heated vapor to said tools, of a source of heat comprising a heat insulating casing constructed to form a chamber, a porous vapor heater dividing the chamber into compartments, a combustion chamber within the casing, a glower in the combustion chamber and means for admitting air to the combustion chamber.

28. In a heat distributing system, the combination with one or more working tools, and vapor conducting means for transferring heated vapor to said tools, of a source of heat comprising a heat insulating casing constructed to form a chamber, a plurality of porous partitions dividing the chamber into compartments, electric heating elements in said partitions, a combustion chamber in the casing, a glower in the combustion chamber which is a non-conductor of electricity at ordinary temperatures but a conductor when hot, means for introducing vapor directly into one of the compartments and through the partitions into the others whereby its temperature is raised in successive stages and then through the glower into fuel in the combustion chamber, and means for admitting air to the receptacle.

29. In a heat distributing system, the combination with one or more working tools, and vapor conducting means for transferring heated vapor to said tools, of a source of heat comprising an outer casing and an inner casing, said casings having adjacent surfaces at least one of which is grooved to form a passage, and the inner casing being constructed to form a chamber, a combustion chamber within said chamber, means for heating vapor and discharging it into the combustion chamber, and means for conducting vapor from said passage into the combustion chamber.

30. In a heat distributing system, the combination with one or more working tools, and vapor conducting means for transferring heated vapor to said tools, of a source of heat comprising an outer casing and an inner casing, said casings having adjacent surfaces at least one of which is provided with a spiral groove to form a passage, a combustion chamber within said inner casing, means for heating a vapor and discharging it into the combustion chamber, a vapor inlet connected with the lower part of said spiral groove, and conduits through the inner casing and through the receptacle connected with the upper part of the spiral groove.

31. In a heat distributing system, a source of heat, a working tool spaced from said source, and a booster intermediate said source and tool comprising a heat intensifying member having a fluid passage, means for electrically generating heat therein, and an outer casing adapted to provide a heat exchange chamber.

32. In a heat distributing system, a source of heat, a working tool spaced from said source, a booster intermediate said source and tool comprising a heat intensifying member having a fluid passage, means for electrically generating heat therein, and an outer casing adapted to provide a heat exchange chamber communicating with the fluid passage and constituting an outlet therefor.

33. In a heat distributing system, a source of heat, a working tool spaced from said source, a booster intermediate said source and tool comprising a heat intensifying member having a relatively long fluid passage and means for electrically generating heat therein, and an outer casing coextensive with the intensifying member and spaced therefrom to provide a heat exchange chamber.

34. In a heat distributing system, a source of heat, a working tool spaced from said source, and a booster intermediate said source and tool comprising a heat intensifying member having a fluid passage, heat absorbent material therein adapted to permit the gradual flow of fluid therethrough, means for electrically generating heat in the passage, and an outer casing adapted to provide a heat exchange chamber.

35. In a heat distributing system, a source of heat, a working tool spaced from said source, and a booster intermediate said source and tool comprising an elongated heat intensifying member having a fluid passage, means for electrically generating heat therein, an outer casing coextensive with the heat intensifying member, interposed porous insulation for electrically separating the casing from the heat intensifying member, said passage being in communication with the casing, by way of the tool, so that the casing constitutes a heat exchange chamber.

36. In a heat distributing system, a source of heat, a working tool spaced from said source, and a booster intermediate said source and tool comprising an elongated heat intensifying member having a fluid passage, means for electrically generating heat therein, an outer casing coextensive with the heat intensifying member, interposed porous insulation for electrically separating the casing from the heat intensifying member, said passage being in communication with the casing by way of the tool whereby fluid may pass through the passage in one direction and back through the casing in the opposite direction.

37. In a heat distributing system, a source of heat, a working tool spaced from said source, and a booster intermediate said source and tool comprising an elongated heat intensifying member having a fluid passage, an electric heating element, a sheath or armor in which the heater is disposed, porous insulation between the heater and the sheath, and means with which the heating element is associated for conducting hot vapor through the device to increase the temperature rapidly and then through the insulation to transfer the heat to the sheath and prevent loss of heat from the element.

38. In a heat distributing system, a source of heat, a working tool spaced from said source, and a booster intermediate said source and tool comprising an elongated heat intensifying member, an inner conductor constituting an electric heating element and a fluid inlet pipe, means in the pipe to retard the flow of vapor therethrough, an outer sheath spaced from the inner conductor and connected thereto by way of the tool and insulating means between the inner conductor and the sheath adapted to permit the flow of vapor therethrough.

39. In a heat distributing system, a source of heat, a working tool spaced from said source, and a booster intermediate said source and tool comprising an elongated heat intensifying member, an electric heating element forming an inner passage through which hot vapor may be supplied, porous insulation surrounding the heating element, and a sheath forming a vapor cahmber and spaced from the heating element by the porous insulation.

40. In a heat distributing system, a source of heat, a working tool spaced from said source, and a booster intermediate said source and tool comprising an elongated heat intensifying member having a fluid passage, means for generating heat in one portion of said passage, and an outer casing adapted to provide a heat exchange chamber.

41. In a heat distributing system, a source of heat, a working tool spaced from said source, and a booster intermediate said source and tool comprising an elongated heat intensifying member, having a fluid passage having a heat exchange section and a heat intensifying section, means for electrically generating heat in the heat intensifying section, an outer casing having a working member adjacent to the heat intensifying section and an extension adapted to carry the fluid from the working member backwardly adjacent to the heat exchange section.

42. In a heat distributing system, a source of heat, a working tool spaced from said source, and a booster intermediate said source and tool comprising an elongated heat intensifying member, an inner member arranged to provide a fluid passage and having a relatively low temperature heat exchange section and a high temperature heat intensifying section, means for generating heat in the heat intensifying section, and an outer casing arranged to provide a return passage for the fluid adjacent to the heat exchange section of the inner member.

43. In a heat distributing system, a source of heat, a working tool spaced from said source, and a booster intermediate said source and tool comprising an elongated heat intensifying member, having a fluid passage, heat absorbent material therein adapted to permit the gradual flow of fluid therethrough, means for electrically generating heat in the passage, an outer casing adapted to provide a heat exchange chamber and a porous mass offering a graded resistance to the return flow of vapor through the casing.

44. In a heat distributing system, the combination with a plurality of working tools, vapor conducting means for transferring heat to said tools, and a source of heat comprising a fuel combustion chamber, an electric glower therein, and means for passing a vapor through said glower into the fuel in the combustion chamber; of means in said conducting means adapted to initiate the operation of the system.

45. In combination with a heater, a working member, a heat intensifying member separate therefrom comprising a fluid passage, and means for electrically generating heat therein, an outer casing coextensive with the heat intensifying member, a fluid passage through said member connected at one of its ends to the first named fluid passage and at its opposite end to said casing.

46. In combination with a heater, a fluid passage comprising a booster and a tool in series, and a heat intensifying member in said booster coextensive with a portion of the length of said passage.

47. In a heat distributing system, a combustion chamber, means for admitting vapor into said chamber, means for dissociating the vapor into its constituent elements, means for causing combustion of certain of said elements partly within and partly outside of said chamber, and adjustable means for determining the quantity thereof to be consumed outside of said chamber.

48. In a heat distributing system, a combustion chamber, means for admitting steam into said chamber, means for dissociating the steam into hydrogen and oxygen, means for admitting air into said chamber whereby the oxygen of the air may combine with said hydrogen, adjustable means for reducing the volume of air admitted whereby the amount of hydrogen ejected from said chamber may be increased, and means for consuming said ejected hydrogen outside of said chamber.

49. In a heat distributing system, a heat distributing member adapted to initiate operation of the system.

50. In a heat distributing system, means for conducting a heat transferring medium through said system comprising a distributing member adapted to initiate operation of the system.

51. In a heat distributing system, means for conducting a vapor through said system comprising a distributing member, electrical means for rendering said member initially active, means for rendering inactive said electrical means, and means for continuing the activity of said member after said electrical means are rendered inactive.

52. In a heat distributing system, a plurality of stations, a channel for passing a heated medium to the stations, and means within said channel for initially heating said medium.

53. A system for distributing heat comprising a plurality of stations, a channel for passing a heated medium to the stations, and means integral with said channel for utilizing said medium to generate additional medium.

54. In a system of heat distribution, a supply channel for passing a heated medium to a desired point, and means integral with said channel for utilizing said medium to generate additional medium.

55. In a system of heat distribution, a supply channel for passing a heated medium to a desired point comprising an inner tube adapted to generate additional medium and an outer casing adapted to provide a heat exchange member.

56. In a system of heat distribution, a supply channel for passing a heated medium to a desired point comprising a tube adapted to generate additional medium and an outer casing spaced therefrom to provide a heat exchange member.

57. In a system of heat distribution, a supply channel for passing a heated medium to a desired point comprising a tube adapted to generate additional medium, an outer casing and interposed insulating material adapted to permit the flow of medium therethrough.

58. In a system of heat distribution, a supply channel for passing a heated medium to a desired point comprising a member adapted to generate additional medium and a mass of porous material adjacent to said member and adapted to conduct said heated medium.

59. A heat distributing system comprising a generator, a pair of adjacent passages connected at one of their ends to said generator, means for introducing into the other end of one of said passages a liquid medium, means in the other of said passages to utilize the heat from said generator to convert the liquid medium to gaseous medium.

60. In a heat generating and distributing system, the combination of a heat generator comprising a chamber, an electric glower therein, means for passing a vapor through said glower; a heater comprising an inner tubular member and an outer casing forming a heat exchange member; and a connecting channel adapted to generate the vapor and pass it when heated from the heat generator to the heater.

61. A system for distributing heat comprising a plurality of working members, heat intensifying members separate therefrom, each having a fluid passage and an outer casing co-extensive with said heat intensifying member, a channel for passing a heated medium to the heat intensifying members and the fluid passage through each of said heat intensifying members to its associated working member.

62. In a heat distributing system, the combination with a source of heat comprising a fuel combustion chamber, an electrical glower therein and means for passing a vapor through said glower into fuel in the combustion chamber, a plurality of working tools and means for conducting the heated vapor to said tools, of a booster intermediate said source and tool having a heat intensifying member, a fluid passage therein and an outer casing adapted to provide a heat exchange chamber.

63. In a heat distributing system, a combustion chamber, means for admitting vapor into said chamber, means for dissociating a portion of the vapor into its elements, a working tool spaced from said chamber, a vapor conducting means for transferring the remaining portion of the vapor from the chamber to the tool, a booster intermediate said chamber and tool comprising a heat intensifying member, a fluid passage therein, and an outer casing adapted to provide a heat exchange chamber and adjustable means for determining the amount of one of said elements to be consumed within the chamber and the amount to be consumed within the booster.

64. In a heat distributing system, the combination with a vapor heater and one or more working tools, of a vapor conductor for transferring vapor from said heater to the tools comprising an elongated casing and a porous mass therein offering a resistance to the flow of vapor.

65. In a heat distributing system, the combination with a vapor heater and one or more working tools, of a hollow chamber containing a porous mass for transferring vapor from said heater to the tools.

66. In a heat distributing system, the combination with a vapor heater and one or more working tools, of a hollow chamber forming a fluid passage, and a porous mass within said chamber offering a resistance to the flow of vapor.

67. A heater, a utility arranged to be energized thereby and a heat exchange member between the heater and the utility, said member being arranged to conduct fluid to the heater and to conduct heated fluid from the heater to the utility.

68. A fluid heater, a non-contiguous utility arranged to be heated by fluid from the heater and a single conduit having a passage for leading fluid to the heater and another passage for leading heated fluid from the heater to the utility.

69. A fluid heater, a non-contiguous utility arranged to be heated by fluid from the heater and a conduit having a passage for leading fluid to the heater and another passage surrounded by said first mentioned passage for leading heated fluid from the heater to the utility.

70. A heater, a utility arranged to be energized thereby, a heat exchange member between the heater and the utility, said member being arranged to conduct fluid to the heater and to conduct heated fluid from the heater to the utility, and an electric heater associated with said member.

71. A fluid heater, a non-contiguous utility arranged to be heated by fluid from the heater, and a conduit having a passage for leading fluid to the heater, another passage for leading heated fluid from the heater to the utility, and an electric heater associated with said conduit.

72. A fluid heater, a non-contiguous utility arranged to be heated by fluid from the heater, and a conduit having a passage for leading fluid to the heater, another passage for leading heated vapor from the heater to the utility, and an electric heater associated with said conduit.

In witness whereof, I have hereunto set my hand this 29th day of June, 1921.

WILLIAM S. HADAWAY, Jr.